April 7, 1925.  S. SNELL ET AL  1,532,518

MIXER

Filed July 18, 1924

S. Snell & W. S. Bridwell
INVENTOR

BY Victor J. Evans
ATTORNEY

O. Thalmann

WITNESS:

Patented Apr. 7, 1925.

1,532,518

UNITED STATES PATENT OFFICE.

STEWART SNELL AND WILLIAM S. BRIDWELL, OF INDIANAPOLIS, INDIANA.

MIXER.

Application filed July 18, 1924. Serial No. 726,833.

*To all whom it may concern:*

Be it known that we, STEWART SNELL and WILLIAM S. BRIDWELL, citizens of the United States, residing at Indianapolis, in the county of Marion and State of Indiana, have invented new and useful Improvements in Mixers, of which the following is a specification.

Our present invention has reference to a fuel mixing device for internal combustion engines.

Our object is to arrange between the carbureter and the intake manifold of an internal combustion engine, a gasket having journaled therein two fans whose blades are arranged at opposite pitches whereby the intake of the fuel contacting with the fans will impart motion to said fans so that the said fuel will be contacted at opposite angles and thoroughly mixed before being admitted into the piston cylinders, the gasket being also provided with one or more ports for the admission of air to be mixed with the gases.

The drawing illustrates a satisfactory embodiment of our improvement, and wherein:—

Figure 1:
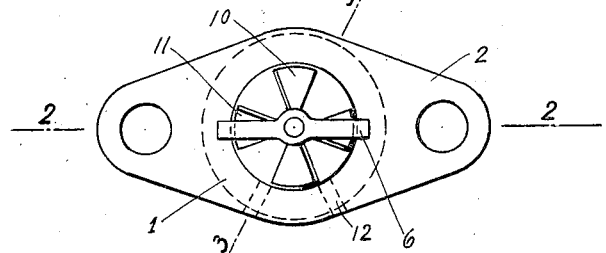
Figure 1 is a side elevation of the invention.
Figure 2:
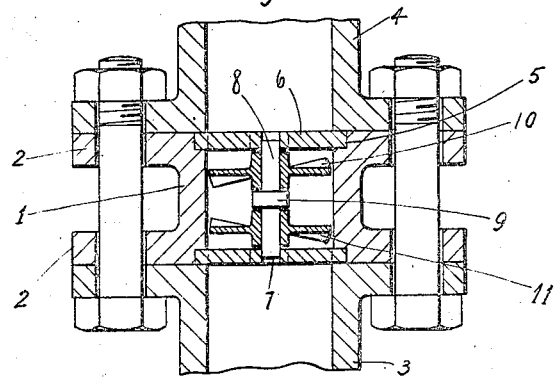
Figure 2 is a sectional view on the line 2—2 of Figure 1, but showing the improvement connected to the end of the intake manifold and to the carbureter of an internal combustion engine.
Figure 3:
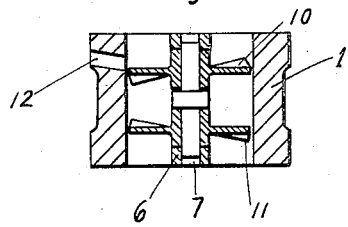
Figure 3 is a sectional view on the line 3—3 of Figure 1.

As disclosed by the drawing, we make use of a gasket including a tubular body portion 1 having its ends formed with lateral flanges 2. The flanges are bolted to the flanges of the carbureter 3 and the intake manifold 4 of an internal combustion engine.

The ends of the gasket are provided with oppositely disposed notches 5, and in each of these notches there are received the ends of a plate 6. Each of the plates is centrally formed with a round opening 7, and in these openings there is journaled a shaft 8. The shaft is centrally formed with an enlargement or hub 9 and has freely journaled thereon the hubs of fan members 10 and 11 respectively. The blades of the fans are arranged at opposite pitches so as to impart a beating action against the vapor that passes from the carbureter into the intake manifold 4. The fans are revolved by the contact of such gases. The gasket 1 is provided with one or more air inlet ports 12, the same being preferably arranged adjacent to the fan nearest the intake manifold 4.

With our improvement, it will be noted that the rotation of the fans will impart a beating action against the vaporized gas that passes between the carbureter and the intake manifold to more effectively break up the particles thereof so that the fluid will be delivered in a better state of combustibility to the engine cylinders. Also by providing the ports 12, it will be seen that fresh air will be caused to mix with the gaseous fluid and it is believed that the foregoing description, when taken in connection with the drawing, will fully set forth the improvement and the advantages thereof.

Having described the invention, we claim:—

In combination with the carbureter and the intake manifold of an internal combustion engine, of a fuel mixer therebetween, comprising a gasket having a round bore communicating with the bores of the carbureter and the intake manifold and having flanges which are bolted to the flanges of the said carbureter and manifold, said gasket having its ends notched, plates seated in the notches and contacting with the ends of the carbureter and the manifold, a shaft journaled in central bearings in the plates and provided with a central hub, fans freely journaled on the shaft at the opposite sides of the hub, each of said fans having its blades struck at opposite angles whereby the said fans will turn in opposite directions, and said gasket having an air inlet port disposed adjacent to the fan nearest the manifold.

In testimony whereof we affix our signatures.

STEWART SNELL.
WILLIAM S. BRIDWELL.